(12) United States Patent
Lee et al.

(10) Patent No.: US 9,838,874 B2
(45) Date of Patent: Dec. 5, 2017

(54) TERMINAL DEVICE AND REMOTE CONTROL METHOD THEREOF, MOBILE DEVICE AND REMOTE CONTROL METHOD THEREOF

(71) Applicant: SAMSUNG ELECTRONICS CO., LTD., Suwon-si (KR)

(72) Inventors: Kang-min Lee, Hwaseong-si (KR); Sun-young Han, Suwon-si (KR); Mi-ju Park, Daejeon (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 86 days.

(21) Appl. No.: 14/699,639

(22) Filed: Apr. 29, 2015

(65) Prior Publication Data

US 2015/0326707 A1 Nov. 12, 2015

(30) Foreign Application Priority Data

May 7, 2014 (KR) .......................... 10-2014-0054384

(51) Int. Cl.
*H04M 3/10* (2006.01)
*H04W 12/08* (2009.01)
*H04M 1/725* (2006.01)

(52) U.S. Cl.
CPC ......... *H04W 12/08* (2013.01); *H04M 1/7253* (2013.01); *H04M 1/72527* (2013.01); *H04M 2250/16* (2013.01)

(58) Field of Classification Search
CPC .. H04M 1/725; H04M 1/72527; H04W 12/08
See application file for complete search history.

(56) References Cited

U.S. PATENT DOCUMENTS

| | | | | |
|---|---|---|---|---|
| 2010/0304729 | A1* | 12/2010 | Sabotta | H04M 3/42365 455/415 |
| 2013/0300546 | A1* | 11/2013 | Kim | G08C 19/00 340/12.22 |
| 2014/0009394 | A1* | 1/2014 | Lee | H04N 5/4403 345/157 |

FOREIGN PATENT DOCUMENTS

| | | |
|---|---|---|
| JP | 2008-28498 A | 2/2008 |
| JP | 2012-99916 A | 5/2012 |
| JP | 5296602 B2 | 9/2013 |

(Continued)

OTHER PUBLICATIONS

Search Report dated Aug. 19, 2015, issued by the International Searching Authority in counterpart International Application No. PCT/KR2015/004491 (PCT/ISA/210).

(Continued)

*Primary Examiner* — Charles Appiah
*Assistant Examiner* — Alexander Yi
(74) *Attorney, Agent, or Firm* — Sughrue Mion, PLLC

(57) ABSTRACT

A terminal device including: a communicator configured establish a phone call with another terminal device having a remote control right to an external device, and to receive state information of the external device from the another terminal device; a display configured to display a mirroring screen corresponding to a screen displayed on the external device based on the received state information; and a controller configured to, in response to a user manipulation command being input on the mirroring screen, transmit a control command for the external device corresponding to the input user manipulation command to the another terminal device.

16 Claims, 12 Drawing Sheets

(56) References Cited

FOREIGN PATENT DOCUMENTS

| KR | 10-2009-0132737 A | 12/2009 |
| KR | 10-2013-0116107 A | 10/2013 |
| KR | 10-2014-0042188 A | 4/2014 |

OTHER PUBLICATIONS

Written Opinion dated Aug. 19, 2015, issued by the International Searching Authority in counterpart International Application No. PCT/KR2015/004491 (PCT/ISA/237).

* cited by examiner

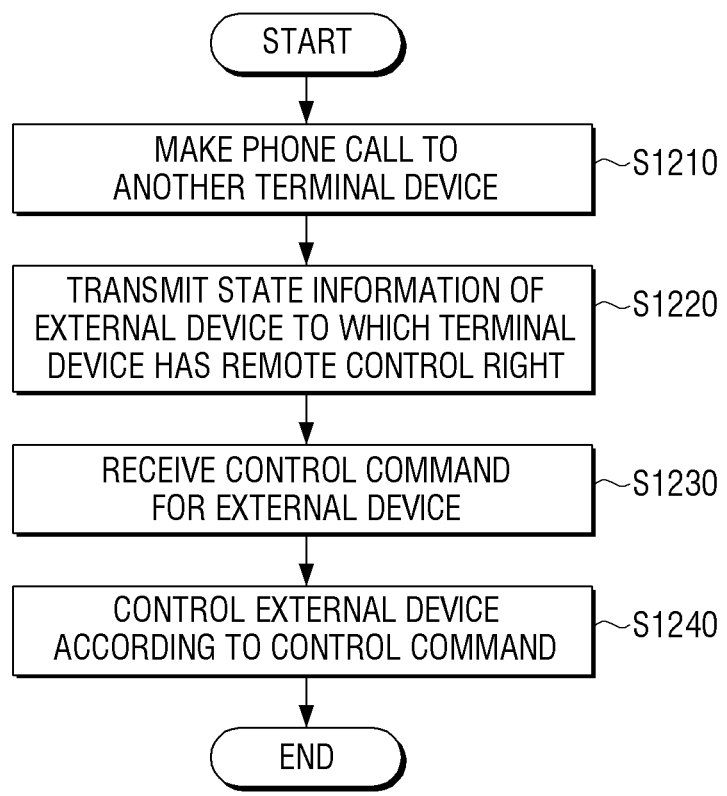

TERMINAL DEVICE AND REMOTE CONTROL METHOD THEREOF, MOBILE DEVICE AND REMOTE CONTROL METHOD THEREOF

CROSS-REFERENCE TO RELATED APPLICATION(S)

This application claims priority under 35 U.S.C. §119 from Korean Patent Application No. 10-2014-0054384, filed on May 7, 2014, in the Korean Intellectual Property Office, the disclosure of which is incorporated herein by reference in its entirety.

BACKGROUND

1. Field

Aspects of one or more exemplary embodiments relate to providing a terminal device and a remote control method thereof, and more particularly, to providing a terminal device that remotely controls a particular device by using a callee terminal device when making a phone call, and a remote control method thereof.

2. Description of the Related Art

Recent developments in wireless communication and data processing technologies enable a portable phone, such as a smartphone, to be a tool that performs various functions, such as voice communication, Internet connections, video communication, Internet banking, etc. Also, due to the prevalence of portable phones, many communications are performed through portable phones, and mobile terminals are important aspects for modern life.

A portable phone having a communication function as described above may operate as a remote control device for controlling other devices. For example, a user may operate a robot cleaner and turn on a TV or change a channel through a portable phone, and share content output from the portable phone with the TV in real time.

However, complicated setup procedures and complicated authentication processes must be performed in order to use a remote control service of the portable phone due to security or privacy concerns. In particular, the TV is allowed to share the content using the portable phone only through a home network, and an external user must acquire an access right to content sharing.

Also, as a part of the remote control service described above, remote access may allow an experienced user to remotely control a device of the inexperienced user. However, an inexperienced user may need to perform a complicated authentication setup processes, and, therefore, inexperienced users fail to use the remote control service of the portable phone. If the inexperienced user gives another user a remote control right to the device in order to solve the above-mentioned problem, security or privacy concerns occur.

SUMMARY

One or more exemplary embodiments address the above problems and/or disadvantages and other disadvantages not described above. Also, one or more exemplary embodiments are not required to overcome all the disadvantages described above, and an exemplary embodiment may not overcome any of the problems described above.

One or more exemplary embodiments provide a terminal device that provides a method of remotely controlling a particular device by using a callee terminal device when making a phone call, and a remote control method thereof.

According to an aspect of one or more exemplary embodiments, there is provided a terminal device including: a communicator configured to establish a phone call with another terminal device having a remote control right to an external device, and to receive state information of the external device from the another terminal device; a display configured to display a mirroring screen corresponding to a screen displayed on the external device based on the received state information; and a controller configured to, in response to a user manipulation command being input on the mirroring screen, transmit a control command for the external device corresponding to the input user manipulation command to the another terminal device.

The another terminal device has a remote control right to a plurality of external devices, and the controller is further configured to control the communicator to receive information about the plurality of external devices from the another terminal device, control the display to display the information, and control the communicator to, in response to a selection of an external device of the plurality of external devices to be remotely controlled from the displayed information, request state information of the selected device.

The controller is further configured to control the display to display the mirroring screen on a whole area of the display.

The controller is further configured to control the communicator to, in response to a content being stored in the terminal device and being moved to an area of the display corresponding to the mirroring screen, transmit the content to the another terminal device, and the control command corresponds to a command for controlling the external device to output the content.

The controller is further configured to control the communicator to, in response to at least devices connected to the terminal device being selected, transmit the content to the selected device.

The controller is further configured to control the display to, in response to the phone call with the another terminal device ending, cease displaying the mirroring screen.

According to another aspect of one or more exemplary embodiments, there is provided a terminal device including: a communicator configured to establish a phone call with another terminal device and to transmit state information of an external device, to which the terminal device has a remote control right, to the another terminal device during the phone call; and a controller configured to, in response to a control command of the external device being received from the another terminal device, control the external device according to the received control command.

The terminal device has a remote control right to a plurality of external devices, and the controller is further configured to control the communicator to, in response to an external device to be remotely controlled being selected from among the plurality of external devices, transmit state information of the selected device to the another terminal device.

The terminal device has a remote control right to a plurality of external devices, and the controller is further configured to control the communicator to transmit information corresponding to the plurality of external devices to the another terminal device and to, in response to receiving a request for state information of a device to be remotely controlled being received from the another terminal device, transmit the state information of the selected device to the another terminal device.

The controller is further configured to control the external device to, in response to receiving a content to be output from the external device from the another terminal device, output the content.

The controller is further configured to, in response to the phone call to the another terminal device ending, cease controlling of the external device according to the received control command.

The controller is further configured to control the external device according to the received control command only during the phone call.

According to another aspect of one or more exemplary embodiments, there is provided a remote control method of a terminal device, the remote control method including: establishing a phone call with another terminal device having a remote control right to an external device; receiving state information of the external device from the another terminal device; displaying a mirroring screen corresponding to a screen displayed on the external device based on the received state information; receiving a user manipulation command on the mirroring screen; and transmitting a control command for the external device corresponding to the received user manipulation command to the another terminal device.

The another terminal device has a remote control right to a plurality of external devices, and the remote control method further includes: receiving information corresponding to the plurality of external devices from the another terminal device; displaying the information corresponding to the plurality of external devices; selecting an external device of the plurality of external devices to be remotely controlled from the displayed information; and requesting state information of the selected device.

The mirroring screen is displayed on a whole area of a display of the terminal device.

The remote control method further includes transmitting, in response to a content stored on the terminal device being moved to an area of the mirroring screen, the content to the another terminal device, wherein the control command corresponds to a command for controlling the external device to output the content.

The remote control method further includes: selecting at least one device connected to the terminal device; and transmitting the content to the selected device.

According to another aspect of one or more exemplary embodiments, there is provided a remote control method of a terminal device, the remote control method including: transmitting, during a phone call being with another terminal device, state information of an external device, to which the terminal device has a remote control right, to the another terminal device; receiving a control command for the external device from the another terminal device; and controlling the external device according to the received control command.

The terminal device has a remote control right to a plurality of external devices, the remote control method further includes selecting an external device from among the plurality of external devices to be remotely controlled, and the transmitting of the state information to the another terminal device includes transmitting state information of the selected device to the another terminal device.

The terminal device has a remote control right to a plurality of external devices, the remote control method further includes transmitting information about the plurality of external devices to the another terminal device, and the transmitting of the state information to the another terminal device includes transmitting, in response to a request for state information of an external device from the plurality of external devices being received from the another terminal device, the state information of the selected device.

The controlling includes, in response to a content to be output from the external device being received from the another terminal device, controlling the external device to output the received content.

According to an aspect of one or more exemplary embodiments, there is provided a mobile device including: a communicator; a display; and a controller configured to: control the communicator to establish a phone call with a terminal device having a remote control right to an external device, control the communicator to receive state information corresponding to the external device from the terminal device, control the display to display to display a mirroring screen corresponding to content displayed on the external device based on the received state information, and control the communicator to, in response to a user manipulation being received corresponding to the mirroring screen displayed on the display and during the phone call, transmit a control command for controlling the external device to the terminal device.

The controller is further configured to control the communicator to request state information corresponding to the external device from the terminal device.

The controller is further configured to control the communicator to transmit content to the terminal device to be displayed on the external device.

The state information includes data corresponding to content currently displayed on the external device.

According to an aspect of one or more exemplary embodiments, there is provided a mobile device including: a communicator; and a controller configured to: control the communicator to establish a phone call with another mobile device, control the communicator to receive state information of an external device, to which the mobile device has a remote control right, from the external device, control the communicator to transmit the state information to the another terminal device while the phone call is established, control the communicator to receive a control command from the another mobile device, and control the external device according to the received control command during the phone call.

The controller is further configured to: control the communicator to receive content from the another mobile device, and control the external device to display the content during the phone call.

The controller is further configured to: control the communicator to repeatedly receive updated state information from the external device, and control the communicator to repeatedly transmit the updated state information to the another mobile device.

The state information includes data corresponding to content currently displayed on the external device.

BRIEF DESCRIPTION OF THE DRAWINGS

The above and/or other aspects will be more apparent by describing certain exemplary embodiments with reference to the accompanying drawings, in which:

FIG. 12 is a flowchart illustrating a remote control method of a second terminal device according to an exemplary embodiment.

DETAILED DESCRIPTION OF THE EXEMPLARY EMBODIMENTS

Figure 1:
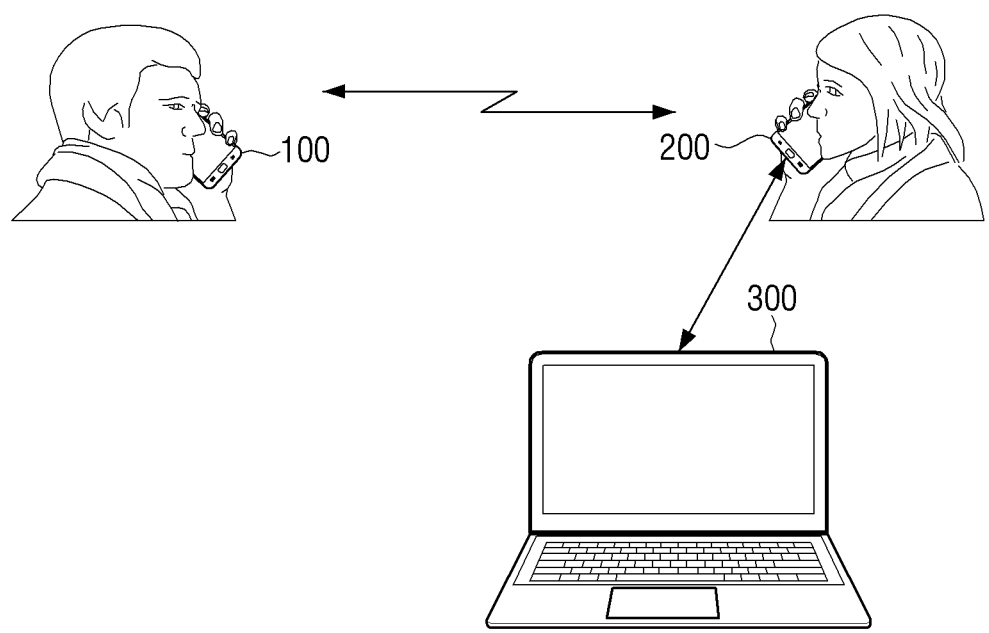
FIG. 1 is a view illustrating a remote control method according to an exemplary embodiment.

One or more exemplary embodiments are described in greater detail below with reference to the accompanying drawings.

In the following description, the same drawing reference numerals are used for the same elements even in different drawings. The matters defined in the description, such as detailed construction and elements, are provided to assist in a comprehensive understanding of one or more exemplary embodiments. One or more exemplary embodiments can be carried out without those specifically defined matters. Also, well-known functions or constructions may not be described in detail since they would obscure the description of one or more exemplary embodiments with unnecessary detail.

FIG. 1 is a view illustrating a remote control method according to an exemplary embodiment.

Referring to FIG. 1, the remote control method may be performed between terminal devices using a phone call connection. For convenience of description, the terminal devices are classified into a first terminal device 100 and a second terminal device 200.

The first and second terminal devices 100 and 200 may be realized as various types of devices such as portable phones, smartphones, tablet computers, notebook computers, digital broadcasting terminals, personal digital assistants (PDAs), portable multimedia players (PMPs), navigation systems, digital televisions (TVs), desktop computers, or the like.

The second terminal device 200 may have a remote control right to an external device 300 and transmit a remote control command to the external device 300 using wired or wireless communication. The external device 300 may operate according to the remote control command transmitted from the second terminal device 200. For example, the second terminal device 200 may acquire an Internet Protocol (IP) address of the external device 300 to access the external device 300 and then control the external device 300. The second terminal device 200 may control the external device 300 using other various well-known remote control technologies which may be well-known. Detailed descriptions of the other various well-known remote control technologies are omitted.

According to an exemplary embodiment, the external device 300 may store characteristic information about a device having a remote control right and allow only respond to remote control request received from a device having the remote control right based on the stored characteristic information. According to another exemplary embodiment, the external device 300 may be connected to the second terminal device 200 through a home network and may be able to be remotely controlled by devices connected through the home network, without an additional authentication process. However, for security purposes, the external device 300 may not allow devices not connected through the home network to control the external device 300. In this case, if a remote control request is received from the first terminal device 100 that is positioned outside the home network, the external device 300 may reject the remote control request.

According to an exemplary embodiment, the first terminal device 100 does not have a remote control right to the external device 300. However, the first terminal device 100 may temporarily control the external device 300 by using a remote control right of the second terminal device 200 when the first terminal device 100 has a phone call connection to the second terminal device 200.

In detail, when the first and second terminal devices 100 and 200 have a phone call connection, the second terminal device 200 may transmit state information about the external device 300 to the first terminal device 100, and the first terminal device 100 may generate a control command for controlling the external device 300 based on the transmitted state information. The generated control command may be transmitted to the external device 300 through the second terminal device 200. The external device 300 may recognize that the control command is transmitted from the second terminal device 200 and operate according to the control command.

If the phone call connection to the second terminal device 200 ends, the first terminal device 100 can no longer remotely control and the external device 300. Also, if the phone call connection between the first and second terminal devices 100 and 200 ends, the external device 300 may cease to operate according to the control command received from the first terminal device 100. In addition, if there is content received from the first terminal device 100, outputting of the content may cease.

In other words, while the phone call connection is active, the first terminal device 100 may temporarily use the remote control right of the second terminal device 200. Therefore, there is a low security risk due to a regular remote control setup, and the first terminal device 100 may control the external device 300 without going through a complicated authentication process with the external device 300. Also, even when a direct connection between the first terminal device 100 and the external device 300 is impossible due to a communication technology problem, a security problem, or the like, the first terminal device 100 may control the external device 300 through the second terminal device 200.

In the above description, the first terminal device 100 may control one external device 300, but there may be a plurality of external devices 300. Also, the external device 300 is illustrated as a notebook computer in FIG. 1, but this is merely an example and any device that may be remotely controlled may be the external device 300. For example, the external device 300 may be various types of devices such as televisions (TV), portable phones, smartphones, refrigerators, stoves, microwave ovens, desktop computers, lighting devices, speakers, stereo systems, etc.

A phone call connection between two terminal devices has been described with reference to FIG. 1. However, the first terminal device 100 may make phone calls to a plurality of other terminal devices and may remotely control a plurality of external devices that are connected to the plurality of other terminal devices.

The first and second terminal devices 100 and 200 that may be realized as various types of devices described in more detail below.

Figure 2:
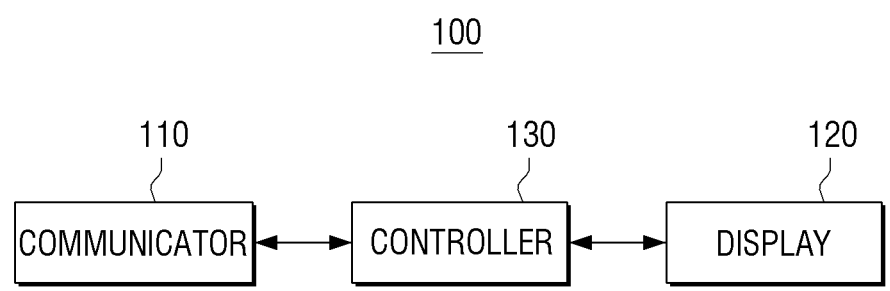
FIG. 2 is a block diagram illustrating a first terminal device according to an exemplary embodiment.

FIG. 2 is a block diagram illustrating the first terminal device 100 according to an exemplary embodiment.

Referring to FIG. 2, the first terminal device 100 may include a communicator 110, i.e., a transceiver, a display 120, i.e., a display unit, and a controller 130.

The communicator 110 is an element that communicates with various types of external devices according to various types of communication methods.

In particular, the communicator 110 may make a phone call to the second terminal device 200 having a remote control right to the external device 300. If a phone number of the second terminal device 200 is input according to an access request input through an input unit, i.e., an input interface or a user interface, the communicator 110 may form a communication path for the phone call to the second terminal device 200 using the input phone number. The communicator 110 may receive a phone call request from the second terminal device 200 and establish a phone call with the second terminal device 200.

After the phone call to the second terminal device 200 is made, the communicator 110 may receive state information corresponding to the external device 300 from the second terminal device 200. The state information of the external device 300 may include information indicating whether the external device 300 is turned on or whether data, such as images, video, audio, or the like, output from the external device 300.

A user of the first terminal device 100 may check a current state of the external device 300 using the received state information of the external device 300. For example, based on the received state information, a screen mirroring a screen that is currently displayed on the external device 300 may be displayed on the first terminal device 100, and the user may input a command for controlling the external device 300 while checking the screen displayed on the external device 300. The mirroring may be in real time.

The communicator 110 may include various types of communication chips such as a WiFi chip, a Bluetooth chip, a near field communication (NFC) chip, a wireless communication chip, etc. Here, the WiFi chip, the Bluetooth chip, and the NFC chip perform communications according to a WiFi method, a Bluetooth method, and an NFC method, respectively. The NFC chip refers to a chip that operates according to an NFC method using a band of 13.56 MHz among various radio frequency identification (RFID) frequency bands, such as 135 kHz, 13.56 MHz, 433 MHz, 860~960 MHz, 2.45 GHz, etc. If the WiFi chip or the Bluetooth chip is used, the communicator 110 may transmit and receive various types of connection information, such as a subsystem identification (SSID), a session key, etc., to perform a communication connection by using the various types of connection information, and then transmit and receive various types of information. The wireless communication chip refers to a chip that performs communications according to various communication standards, such as IEEE, Zigbee, $3^{rd}$ Generation (3G), $3^{rd}$ Generation Partnership Project (3GPP), Long Term Evolution (LTE), etc.

The display 120 is an element that displays a screen including at least one object. The display 120 may be realized as various types of displays such as a liquid crystal display (LCD), an organic light-emitting diode (OLED) display, a plasma display panel (PDP), etc. The display 120 may include a driver circuit, a backlight unit, etc. that may be realized, such as, as non-limiting examples, an amorphous silicon (a-si) thin film transistor (TFT), a low temperature poly silicon (LTPS) TFT, an organic TFT (OTFT), etc. The display 120 may also be realized as a touch screen together with a sensor.

In particular, the display 120 may display a mirroring screen of the screen displayed on the external device 300 based on the received state information of the external device 300. The controller 130 may request through the communicator 110 that the second terminal device 200 transmit the state information of the external device 300 at preset time intervals, periodically, or at various intervals or frequencies. The controller 130 may also control the display 120 to display the updated mirroring screen according to the state information that is transmitted.

If the mirroring screen is displayed in an area of the display 120 initially, and then a user manipulation for enlarging the mirroring screen is input, the controller 130 may control the display 120 to display the mirror screen on a whole or greater area of the display 120.

Also, when an application stored in the first terminal device 100 is executed, the display 120 may display various types of screens corresponding to the executed application. For example, if a phone call application is executed, the display 120 may display a phone call screen displaying a state of a phone call to the second terminal device 200, and the phone call screen may include information about a callee, a keypad, a remote control button, etc.

As another example, if an application for playing content is executed, the display 120 may list and show content stored in the first terminal device 100. If one of the listed content is selected, the selected content may be displayed on the display 120.

Various types of screens that may be displayed on the display 120 will be described in more detail later with reference to FIGS. 4 through 10.

The controller 130 is an element that may control an overall operation of the first terminal device 100. The controller 130 may be implemented as hardware, software, or a combination of hardware and software, such as a general or special purpose processor and a memory storing a program executable by the processor.

The controller 130 may control the display 120 to display the mirroring screen using the state information of the external device 300 received from the second terminal device 200. Also, if the controller 130 receives a user manipulation command of the external device 300 on the mirroring screen, the controller 130 may transmit a control command of the external device 300 corresponding to the user manipulation command to the second terminal device 200.

For example, if the display 120 is realized as a touch screen, and a touch is sensed at a particular point on the mirroring screen, the controller 130 may transmit a control command including coordinate information of the touched point to the second terminal device 200. In this case, the coordinate information may be coordinate information that is determined relative to the mirroring screen.

The second terminal device 200 may transmit the control command including the coordinate information to the external device 300. If the external device 300 is realized as a desktop computer, or a notebook computer, or the like, where a manipulation of a user may be displayed as a mouse pointer or the like, the external device 300 may move a position of the mouse pointer to the corresponding particular point, display the mouse pointer at the particular point according to the coordinate information included in the transmitted control command, and perform an operation of clicking the corresponding particular point.

The controller 130 may request the second terminal device 200 to transmit the state information of the external device 300. According to an exemplary embodiment, if the remote control button is selected on the phone call screen displayed on the display 120, the controller 130 may transmit a remote control request for the external device 300 to the second terminal device 200, and the second terminal device 200 may display a remote control request message. If a user of the second terminal device 200 accepts the remote control request, the state information of the external device 300 may be transmitted from the second terminal device 200 to the first terminal device 100.

If there is a plurality of external devices 300 to which the second terminal device 200 has remote control rights, the controller 130 may request information about the plurality of external devices 300 from the second terminal device 200. The controller 130 may receive the information about the plurality of external devices 300 from the second terminal device 200 to display the information on the display 120. For example, the controller 130 may control the display 120 to display a plurality of icons corresponding to the plurality of external devices 300. Screens that are displayed on the display 120 by the plurality of external devices 300 will be described in detail later with reference to FIG. 6.

If a device to be remotely controlled is selected from the displayed information, the controller 130 may request state information of the selected device from the second terminal device 200. The second terminal device 200 may respond to the request to transmit the state information of the device, which is selected from the plurality of external devices 300 by the first terminal device 100, to the first terminal device 100. The controller 130 may control the display 120 to display the mirroring screen by using the transmitted state information.

The controller 130 may display the mirroring screen in an area of the display 120, and then enlarge and display the mirroring screen according to a user manipulation. For example, if a touch on the area displaying the mirroring screen is sensed for a preset period of time or more, the controller 130 may control the display 120 to display the mirroring screen in a whole or greater area of the display 120.

According to another exemplary embodiment, the first terminal device 100 includes one or more sensors, such as a geomagnetic sensor, a gyro sensor, an acceleration sensor, etc. The controller 130 senses that the first terminal device 100 is inclined at or greater than a preset angle, the controller 130 may control the display 120 to enlarge the mirroring screen.

The controller 130 may transmit a control command to the second terminal device 200 for outputting a content, which is selected from content stored in the first terminal device 100, on the external device 300.

For example, if a content stored in the first terminal device 100 is moved into the area displaying the mirroring screen, the controller 130 may transmit the content to the second terminal device 200. In this case, the control command is a control command for outputting the content moved onto the mirroring screen from the external device 300. The content may be transmitted to the external device 300 through the second terminal device 200 to be output through a display of the external device 300.

If there is at least one device that is connected to the first terminal device 100, the controller 130 may transmit the content to the at least one device. In other words, the same content may be simultaneously output from the external device 300 and the at least one device connected to the first terminal device 100.

Also, if the phone call to the second terminal device 200 ends, the controller 130 may cease displaying the mirroring screen. In other words, if the phone call ends, a remote control of the external device 300 ends.

Figure 3:
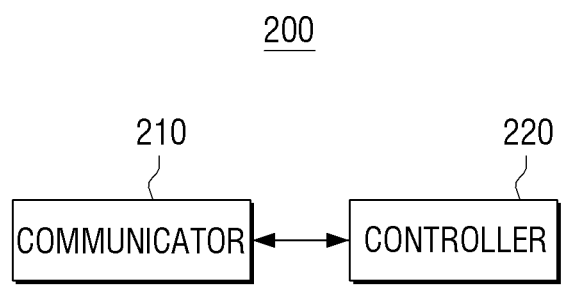
FIG. 3 is a block diagram illustrating a second terminal device according to an exemplary embodiment.

FIG. 3 is a block diagram illustrating the second terminal device 200, according to an exemplary embodiment.

The second terminal device 200 may be realized as various types of devices, similar to the first terminal device 100. For convenience of description, the second terminal device 200 is distinguished from the first terminal device 100 but may perform all of functions that are performed by the first terminal device 100.

Referring to FIG. 3, the second terminal device 200 may include a communicator 210 and a controller 220.

The communicator 210 is an element that communicates with various types of external devices according to various types of communication methods.

In particular, the communicator 210 may make a phone call to the first terminal device 100. In detail, if a phone number of the first terminal device 100 is input through an input unit, the communicator 210 may form a communication path for making the phone call to the first terminal device 100. The communicator 210 may receive a phone call request from the first terminal device 100 and establish a phone call with the first terminal device 100.

The communicator 210 may receive state information of the external device 300 from the external device 300. In detail, the controller 220 may request the state information from the external device 300 through the communicator 210. The external device 300 may check whether the second terminal device 200 has a remote control right to the external device 300 and, if it is determined that the second terminal device 200 has the remote control right to the external device 300, transmit the state information to the second terminal device 200.

After making the phone call to the first terminal device 100, the communicator 210 may transmit the state information of the external device 300, to the first terminal device 100. The state information of the external device 300 may include information indicating whether the external device 300 is turned on or whether data, such as images, video, audio, or the like, is output from the external device 300. The first terminal device 100 may receive the state information of the external device 300 in order to display a mirroring screen.

Other detailed operations of the communicator 210 may be the same as those of the communicator 110 of the first terminal device 100, and thus their repeated descriptions are omitted.

The controller 220 is an element that may control an overall operation of the second terminal device 200.

In particular, the controller 220 may control an overall operation of the external device 300. The second terminal device 200 is given a right to remotely control the external device 300.

The second terminal device 200 may register at least one device as a device to be remotely controlled. For example, if the second terminal device 200 is a manager device that manages a device connected to a home network, devices that are connected to the home network may be automatically registered as devices to be remotely controlled in the second terminal device 200. Alternatively, a user may manually register a particular device as a device to be remotely controlled in the second terminal device 200.

The registration of the devices to be remotely controlled may include authentication and approval processes for giving a remote control right. For example, if the second terminal device 200 transmits a remote control request to the external device 300, the external device 300 may display a message window for an approval for the remote control request. If an ID and a password are input into the message window displayed on the external device 300, the external device 300 may authenticate a user and be registered as a device to be remotely controlled in the second terminal device 200. This process may be performed initially. Subsequently, the second terminal device 200 may control the external device 300 without an additional authentication process.

The second terminal device 200 may utilize various other of existing remote control methods.

The controller 220 may control the external device 300 according to a control command that is input to the second terminal device 200. Also, if the controller 220 receives a control command of the external device 300 from the first terminal device 100, the controller 220 may control the external device 300 according to the received control command. For security, the second terminal device 200 may receive a control command from another terminal device during a phone call with another terminal device. Once the phone call ends, the second terminal device 200 may not receive or forward any more control commands.

According to an exemplary embodiment, if the second terminal device 200 has remote control rights to a plurality of external devices 300, a device to be remotely controlled may be selected from the plurality of external devices 300. If the device to be remotely controlled is selected from the plurality of external devices 300, the controller 220 may transmit state information of the selected device to the first terminal device 100 through the communicator 210.

For example, the controller 220 may control a display to display the plurality of external devices 300 in icon forms. The controller 220 may request a device corresponding to an icon selected from a plurality of displayed icons by the user to transmit state information.

According to another exemplary embodiment, a device to be remotely controlled may be selected on the first terminal device 100, and not on the second terminal device 200. In detail, if there is a plurality of external devices 300, the controller 220 may transmit information about the plurality of external devices 300 to the first terminal device 100. A device to be remotely controlled may be selected on the first terminal device 100 based on the information about the plurality of external devices 300. If the first terminal device 100 requests state information of the selected device to be remotely controlled, the controller 220 may transmit the state information of the selected device to the first terminal device 100.

If a remote control request is received from the first terminal device 100 during a phone call with the first terminal device 100, the controller 220 may display a remote control request message on the display of the second terminal device 200. If the user of the second terminal device 200 accepts a remote control, the state information of the external device 300 may be transmitted from the second terminal device 200 to the first terminal device 100.

However, the remote control request of the first terminal device 100 may be limited by a setting of the second terminal device 200. In other words, the remote control of the external device 300 may be limited to users of the second terminal device 200, and thus a security problem may be prevented from occurring due to the remote control. Alternatively, a user of the first terminal device 100 may only be able to remotely control a subset of functions of the external device 300 through the second terminal device 200.

If a content to be output from the external device 300 is received from the first terminal device 100, the controller 220 may control the external device 300 to output the content. In detail, the controller 220 may transmit the received content to the external device 300.

If the phone call with the first terminal device 100 ends, the external device 300 may cease outputting of the content. In other words, if the phone call to the first terminal device 100 ends, the controller 220 ceases the remote control of the external device 300 that is performed by the second terminal device 200.

Various types of screens may be displayed on the first terminal device 100 or the second terminal device 200 according to various exemplary embodiments.

Figure 4:
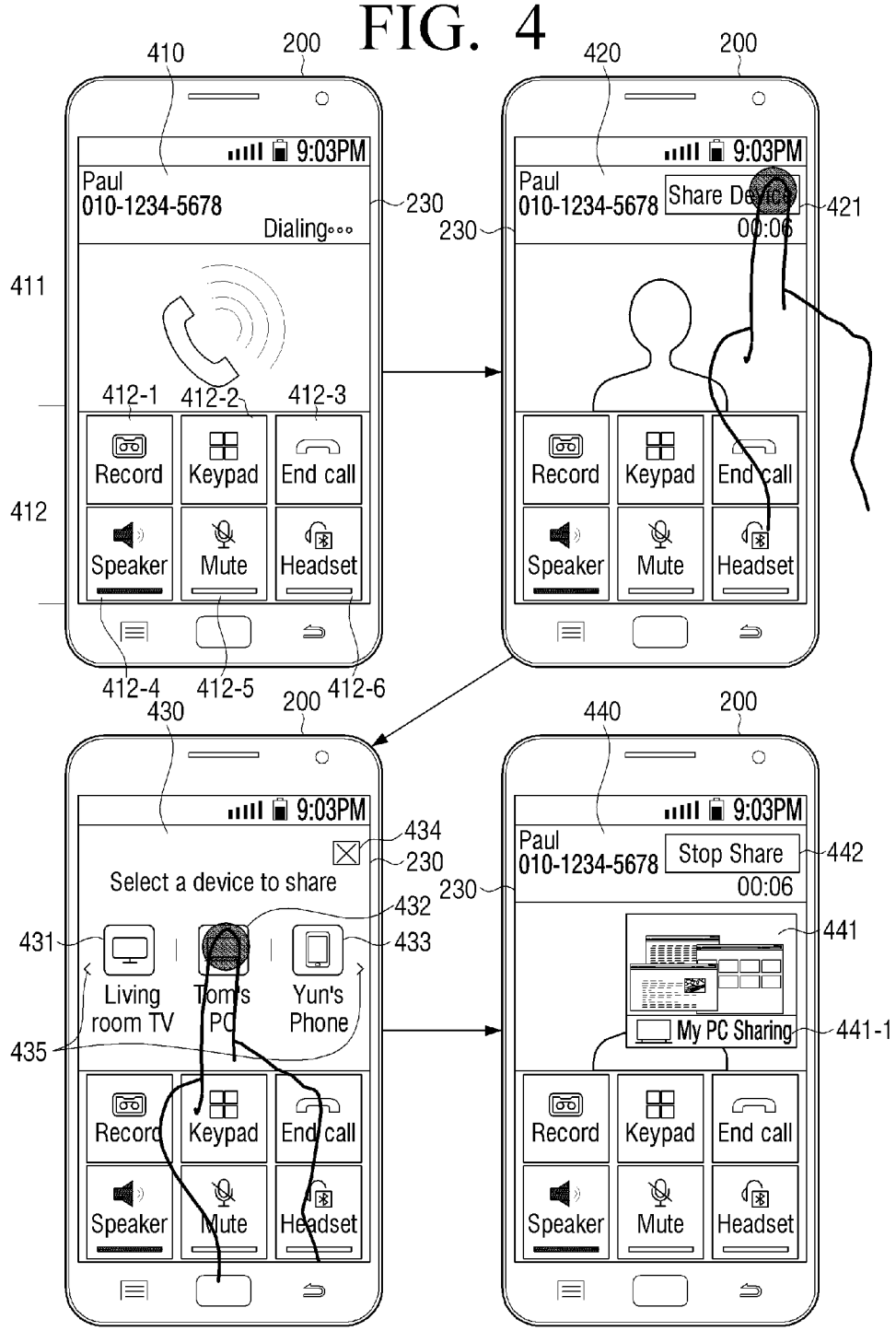
FIG. 4 is a view illustrating screens that may be displayed on a second terminal device according to an exemplary embodiment.

FIG. 4 is a view illustrating screens that are displayed on the second terminal device 200, according to an exemplary embodiment.

Referring to FIG. 4, if the second terminal device 200 makes a phone call to the first terminal device 100, the controller 220 of the second terminal device 200 may control a display 230 to display a screen 410 indicating that the phone call is being made. If the second terminal device 200 accepts the phone call, the controller 220 may control the display 230 to change the screen 410 indicating that the phone call is being made, into a screen 420 indicating that the phone call is made and display the screen 420.

The screen 420 may include a button 421 for changing the screen 420 into a screen for selecting a device to be remotely controlled. Therefore, if the button 421 is selected, a screen 430, which displays an icon corresponding the external device 300 to which the second terminal device 200 has a remote control right, may be displayed. If there is a plurality of external devices 300, the screen 430 may include a plurality of icons 431, 432, and 433 corresponding to the plurality of external devices 300.

If the icon 432 corresponding to a personal computer (PC) is selected from the plurality of icons 431, 432, and 433, state information of the PC may be received from the PC and then transmitted to the first terminal device 100.

If a cancel button 434 is selected, a screen indicating that a status of the phone call, such as the screen 420, may be displayed. The number of icons that may be displayed on one screen may be limited. Thus, a direction button 435 may be displayed, and, if a direction button 435 is selected, icons of other external devices may be sequentially displayed.

If the icon 432 corresponding to the PC is selected, the thumbnail screen 441 mirroring a screen displayed on the PC may be displayed on the screen 440 based on the state information of the PC received from the PC. The thumbnail screen 441 may include an area 441-1 in which a name of a device to be remotely controlled is displayed. The screen 440 may include a remote control end button 442 for ceasing to receive control commands from the first terminal device 100.

Each of the screens 410, 420, 430, and 440 may include a fixed area 412 that is not changed between the screens 410, 420, 430, and 440 and a variable area 411. The fixed area 412 may include a button 412-1 for recording a call, a button 412-2 for calling a keypad to input numbers, a button 412-3 for ending the call, a button 412-4 for placing a call on a speaker, a mute button 412-5, a button 412-6 for wirelessly connecting to a headset, etc.

Figure 5:
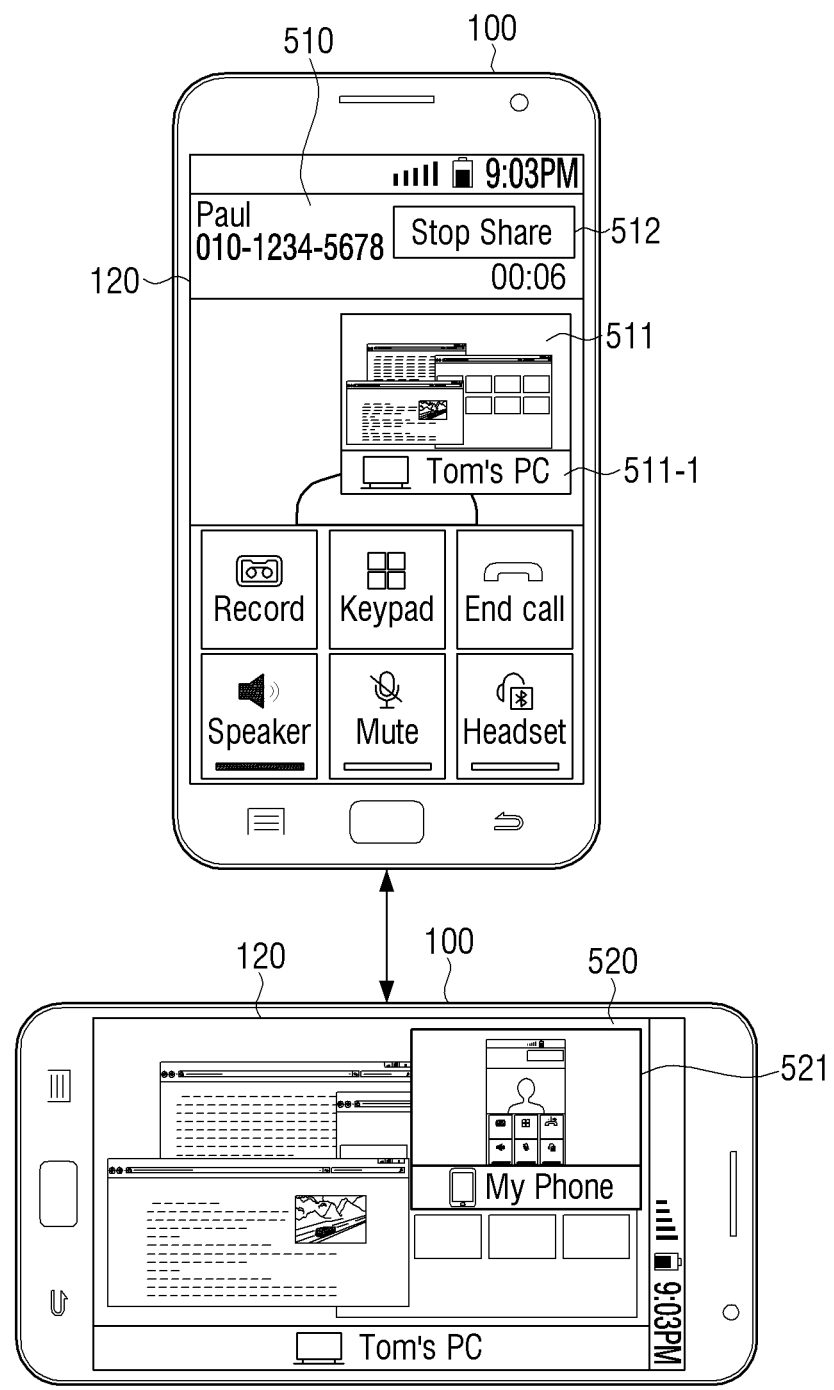
FIGS. 5 and 6 are views illustrating screens that may be displayed on a first terminal device according to various exemplary embodiments.

FIG. 5 is a view illustrating screens that are displayed on the first terminal device 100, according to an exemplary embodiment.

Referring to FIG. 5, the controller 130 of the first terminal device 100 may receive state information of the external device 300 from the second terminal device 200 and control the display 120 to display the mirroring screen 520 mirroring a screen currently displayed on the external device 300 based on the received state information.

Like the second terminal device 200, the first terminal device 100 may display a screen 510 indicating that a phone call is made, and the screen 510 may include a mirroring screen 511 and a button 512 for ending a remote control. The mirroring screen 511 may include an area 511-1 in which a name of a device to be controlled is displayed.

If a user manipulation for enlarging the mirroring screen 511, e.g., within a preset time interval two touches are sensed in the area in which the mirroring screen 511 is displayed, or a change in orientation of the first terminal device 100 from a vertical direction toward a horizontal direction is sensed, the controller 130 may control the display 120 to display a screen 520 with the mirroring screen 511 enlarged. For example, if two touches are sensed within a preset period of time in the area in which the mirroring screen 511 is displayed or a touch is sensed for a preset period of time or more, the controller 130 may control the display 120 to display a screen in the horizontal direction.

The screen 520 may include an area 521 in which a phone call screen is displayed. If a user manipulation touching the area 521 displaying the phone call screen or the like is input, the screen 510 including the mirroring screen 511 may be displayed again.

The user of the first terminal 100 may more easily perform an input for controlling the external device 300 through an enlarged screen.

Figure 6:
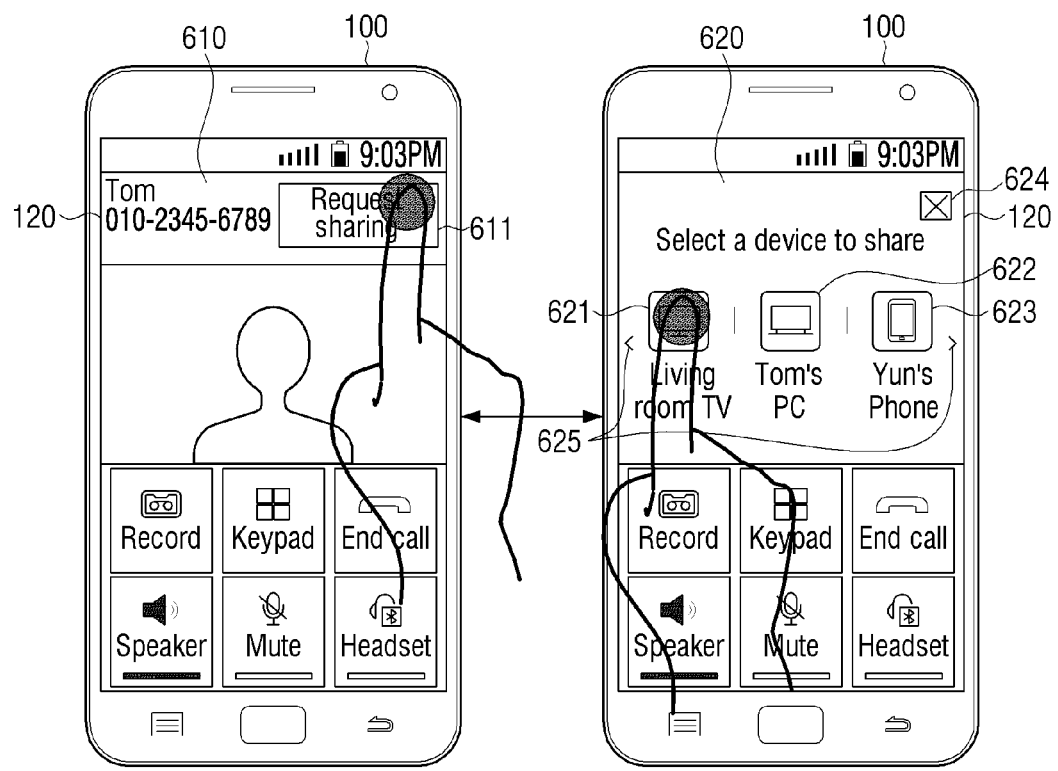

FIG. 6 is a view illustrating screens that may be displayed on the first terminal device 100, according to an exemplary embodiment.

According to an exemplary embodiment, as described above, the controller 130 of the first terminal device 100 may transmit a remote control request to the second terminal device 200, receive information about a plurality of external devices to which the second terminal device 200 has remote control rights, and control the display 120 to display the information.

Referring to FIG. 6, if a phone call to the second terminal device 200 is made, the display 120 may display a screen 610 indicating the phone call, and the screen 610 may include a button 611 for a remote control request. If the button 611 for the remote control request is selected, the controller 130 may transmit the remote control request to the second terminal device 200.

The second terminal device 200 may respond to the remote control request received from the first terminal device 100 and transmit information about a plurality of external devices, to which the second terminal device 200 has remote control rights, to the first terminal device 100.

If the controller 130 of the first terminal device 100 receives the information about the plurality of external devices, the controller 130 may control the display 120 to display a screen 620 that displays icons corresponding to the plurality of external devices.

The screen 620 may include a plurality of icons 621, 622, and 623 respectively corresponding to the plurality of external devices.

If the icon 621 corresponding to a living room TV is selected from among the plurality of icons 621, 622, and 623, the controller 130 may request state information about the living room TV from the second terminal device 200. If the state information about the living room TV is received from the second terminal device 200 according to the request, the controller 130 may control the display 120 to display a mirroring screen mirroring the screen displayed by the living room TV based on the received state information.

If a cancel button 624 is selected, the screen 610 indicating the phone call may be re-displayed. The number of icons correspond to external devices that may be displayed on one screen may be limited. Therefore, if a direction button 625 is selected, icons corresponding to other external devices may be displayed.

Figure 7:
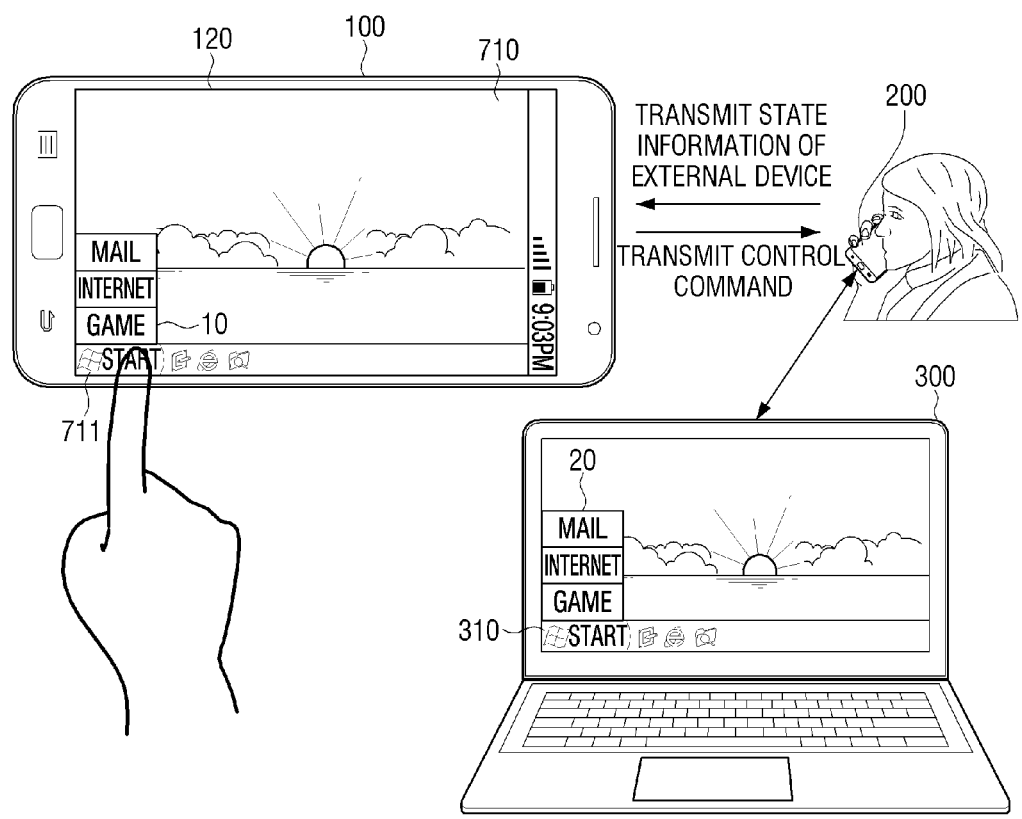
FIG. 7 is a view illustrating a remote control methods according to an exemplary embodiment.

FIG. 7 is a view illustrating a remote control method according to an exemplary embodiment.

Referring to FIG. 7, the controller 130 of the first terminal device 100 may receive state information of the external device 300 from the second terminal device 200 and control the display 120 to display the mirroring screen 710 mirroring a screen currently displayed on the external device 300 based on the received state information.

For example, as shown in FIG. 7, if a start button 711 displayed on the mirroring screen 710 is touched (or clicked), the controller 130 may calculate relative coordinates of the touched point with respect to the mirroring screen 710, include the calculated coordinate information in a control command, and transmit the coordinate information included in the control command to the second terminal device 200.

The controller 220 of the second terminal device 200 may control the external device 300 according to the control command received from the first terminal device 100. The external device 300 that receives the control command may display an item list 20 that is output when a start button 310 is selected, as if the start button 310 is directly selected.

The controller 130 of the first terminal device 100 may control the display 120 to display the mirroring screen 710 mirroring a screen currently displayed on the external device 300 in real time based on state information of the external device 300 received through the second terminal device 200. As shown in FIG. 7, the item list 20 may be displayed on the mirroring screen 710 like the screen displayed on the external device 300.

Figure 8:
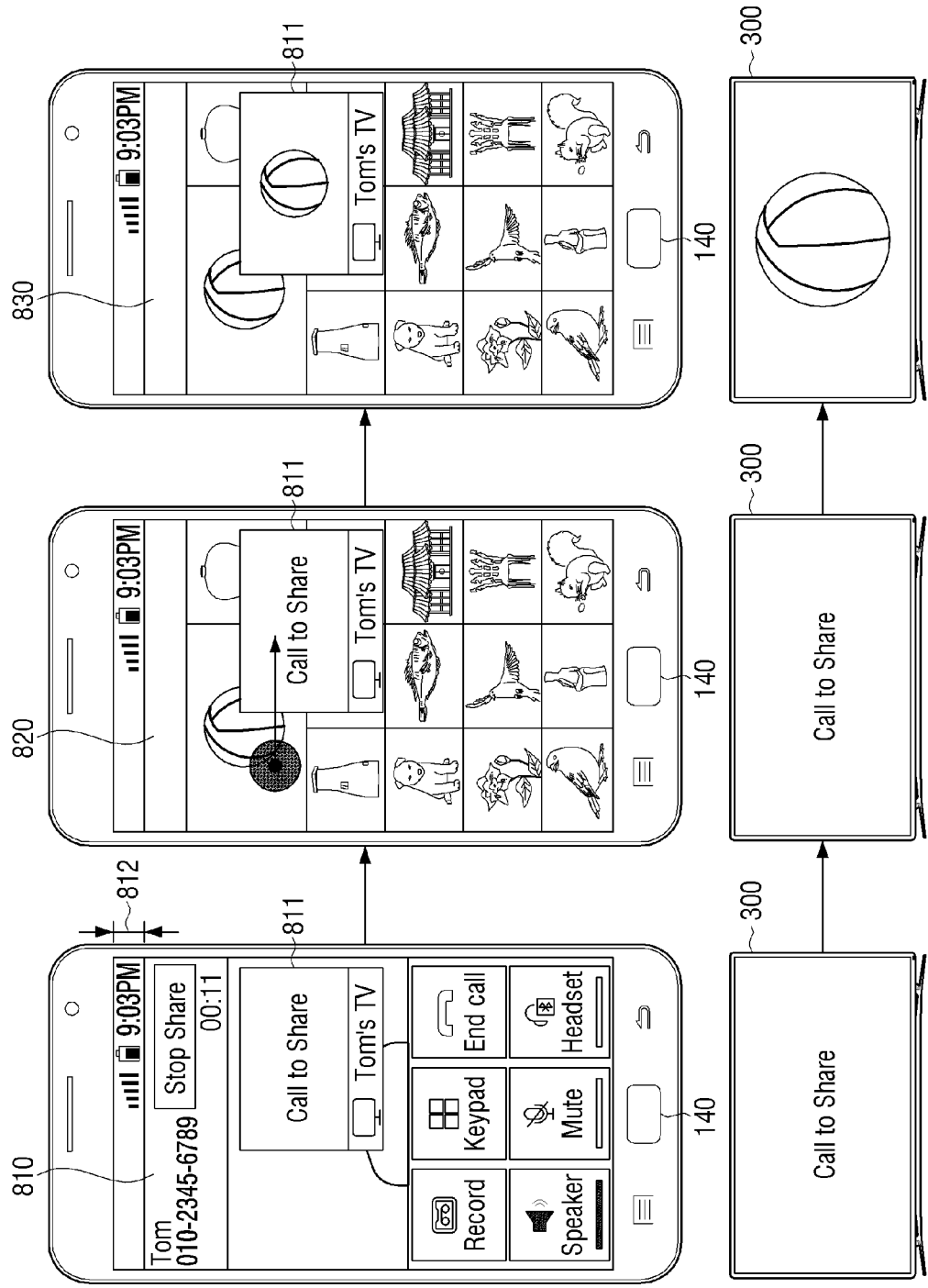
FIG. 8 is a view illustrating screens that may be displayed on a first terminal device according to an exemplary embodiments

FIG. 8 is a view illustrating screens that are displayed on the first terminal device 100 according to an exemplary embodiment.

According to an exemplary embodiment, the user of the first terminal device 100 may transmit a content the user wants to display through the external device 300, to the external device 300 through the second terminal device 200.

Referring to FIG. 8, if state information of the external device 300 is received from the second terminal device 200, the controller 130 of the first terminal device 100 may control the display 120 to display the mirroring screen 811 mirroring a screen output from the external device 300.

The first terminal device 100 may store an album application having a function of listing and showing content (i.e., images, videos, etc.) stored in the first terminal device 100. If the album application is executed when the mirroring screen 811 is displayed, the controller 130 may control the display 120 to display a screen 820 of the album application, including the mirroring screen 811.

According to an exemplary embodiment, the user may select a home button 140 provided in the first terminal device 100 to execute the album application. If the home button 140 is selected, a home screen including icons of various types of applications may be displayed including the mirroring screen 811. If an icon of the album application provided on the home screen is selected, the screen 820 may be displayed as shown in FIG. 8.

The screen 820 is a screen that lists content stored in the first terminal device 100. As shown in FIG. 8, if a user manipulation of dragging a particular content into an area displaying the mirroring screen 811 is input, the controller 130 may transmit the particular content to the second terminal device 200. Here, a control command that is transmitted to the second terminal device 200 may be a command of controlling the external device 300 to display a content.

The controller 130 controls the display 120 to display a screen 830 including the mirroring screen 811 displaying the dragged content. Also, the controller 220 of the second terminal device 200 may control the external device 300 to display the content received from the first terminal device 100 based on the control command.

If a phone call between the first and second terminal devices 100 and 200 ends, the external device 300 may stop displaying of the content and output previously output content.

According to an exemplary embodiment, if the second terminal device 200 requests the state information, the external device 300 may stop outputting existing output content and output a screen displaying "Call to Share" to enter a remote control preparation state as shown in FIG. 8.

Figure 9:
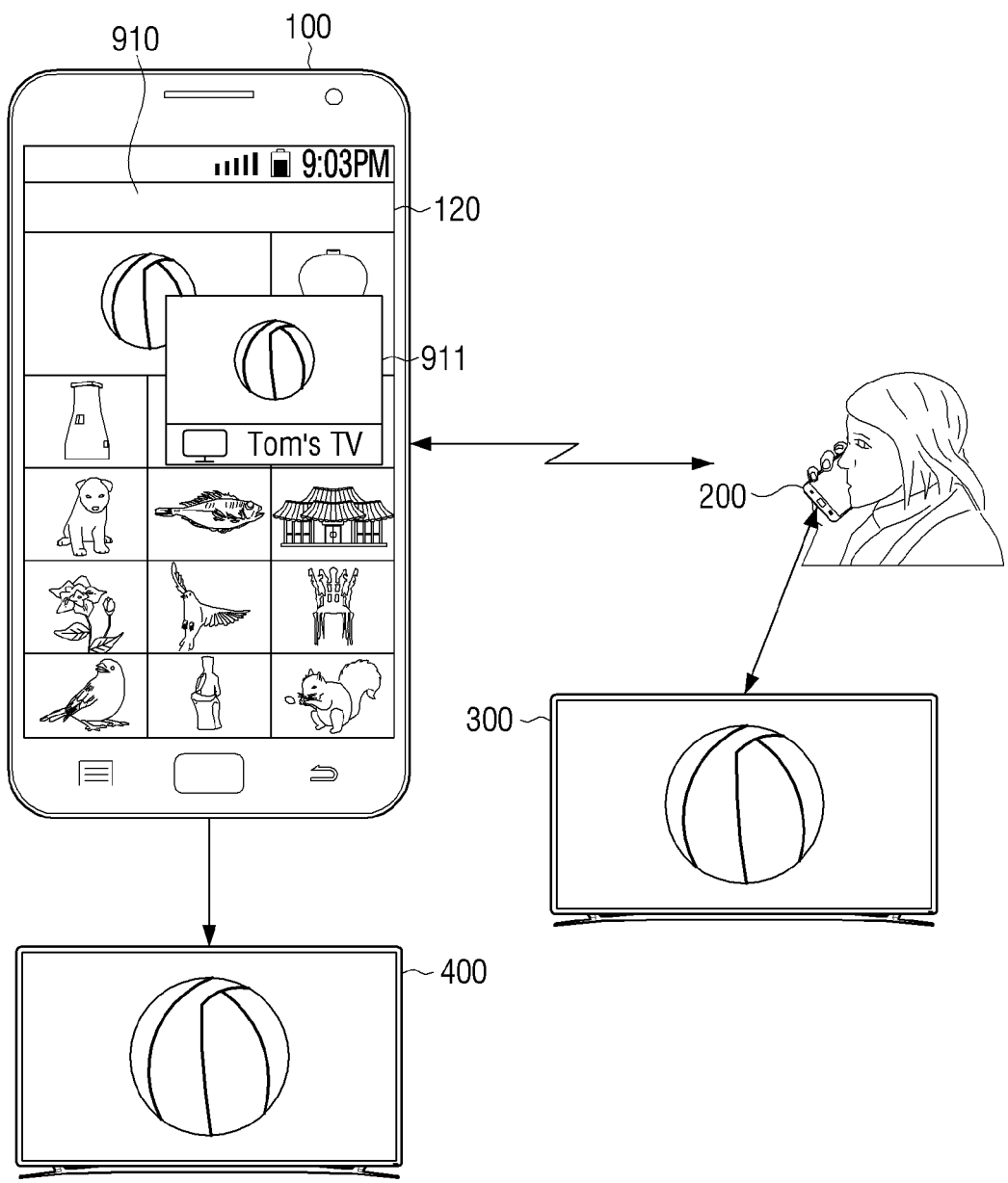
FIGS. 9 and 10 are views illustrating remote control methods according to various exemplary embodiments.
Figure 10:
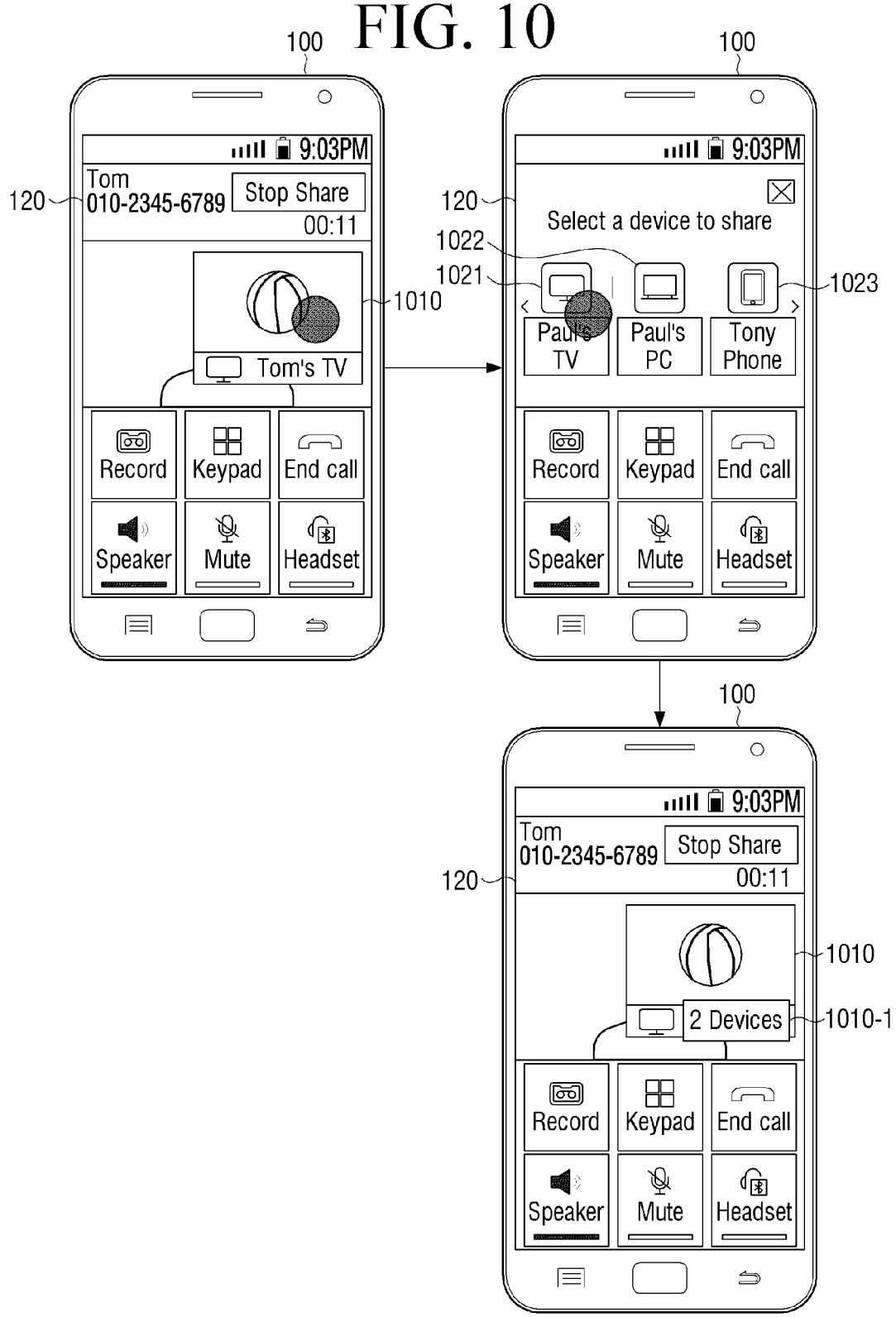

FIGS. 9 and 10 are views illustrating a remote control method according to an exemplary embodiment.

Referring to FIG. 9, as described above, the external device 300 may output a content, which is received from the first terminal device 100, through the second terminal device 200. In this case, if a particular user manipulation is input from the first terminal device 100, the controller 130 may control a device 400 connected to the first terminal device 100 to display the same content as that displayed on the external device 300.

In detail, referring to FIG. 10, if a touch is sensed for a preset time in an area of the display 120 of the first terminal device 100 displaying a mirroring screen 1010, the controller 130 may control the display 120 to display a plurality of icons 1021, 1022, and 1023 corresponding to at least one device connected to the first terminal device 100.

As shown in FIG. 10, if the icon 1021 corresponding to a TV is selected from the plurality of icons 1021, 1022, and 1023, the controller 130 may transmit a content to the TV connected to the first terminal device 100.

An area 1010-1 of a mirroring screen 1010 may display text informing the user that a content is displayed on two devices, i.e., on the external device 300 and the device 400 connected to the first terminal device 100.

According to various exemplary embodiments, the user of the first terminal device 100 may be temporarily given a remote control right to control the external device 300 to which the second terminal device 200 has a remote control right when a phone call is made to the second terminal device 200. Therefore, the user of the first terminal device 100 may easily control the external device 300 without a complicated authentication process. Also, a remote control right is limited to during a phone call, and thus a security problem may be prevented from occurring.

Figure 11:
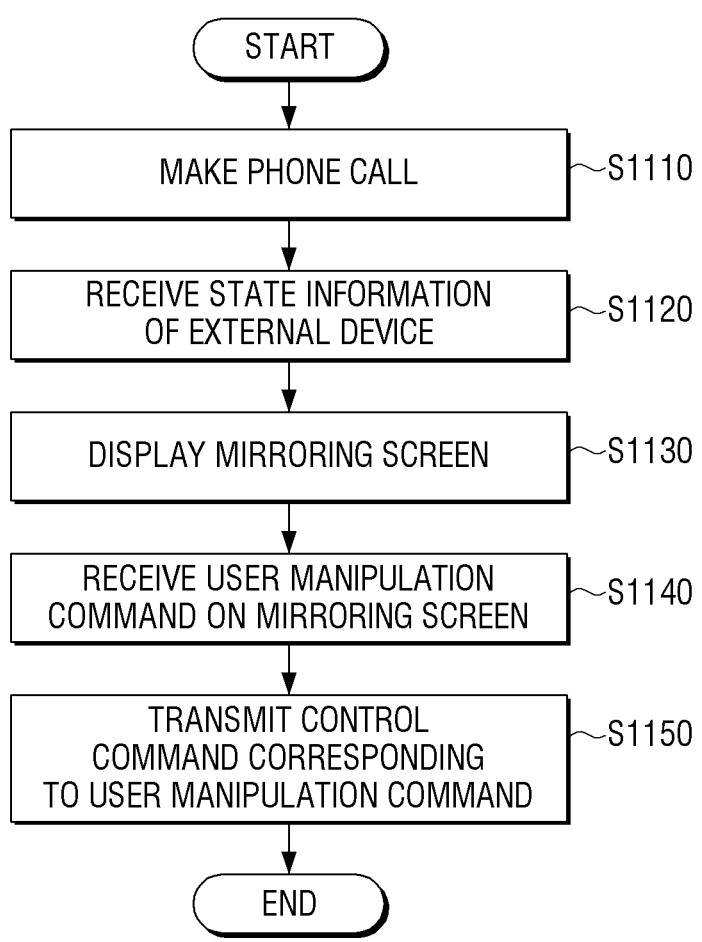
FIG. 11 is a flowchart illustrating a remote control method of a first terminal device according to an exemplary embodiment.

FIGS. 11 and 12 are flowcharts illustrating remote control methods according to various exemplary embodiments.

In detail, FIG. 11 is a flowchart illustrating a remote control method of the first terminal device 100, according to an exemplary embodiment.

Referring to FIG. 11, in operation S1110, the communicator 110 of the first terminal device 100 makes a phone call to the second terminal device 200 having a remote control right to the external device 300. In detail, the user of the first terminal device 100 may input a phone number allocated to the second terminal device 200 to make the phone call to the second terminal device 200. In operation S1120, the communicator 110 receives state information of the external device 300 from the second terminal device 200.

In operation S1130, the display 120 may display the mirroring screen mirroring a screen currently displayed on the external device 300 based on the received state information. The second terminal device 200 may have the remote control right to the external device 300, and the controller 220 of the second terminal device 200 may request state information from the external device 300 to remotely control the external device 300. The state information includes data, such as images, audio, video, etc., which are currently output by the external device 300, or information related to a current state of the external device 300, i.e., whether the external device 300 is turned on or off. The controller 220 of the second terminal device 200 may request and receive the state information from the external device 300 at preset time intervals and transmit the state information to the first terminal device 100. The external device 300 may determine whether the request for the state information is a request from a device having a control right.

In operation S1140, the controller 130 of the first terminal device 100 controls the display 120 to display a mirroring screen based on the state information, and the user inputs a manipulation command of the external device 300 on the mirroring screen.

If the display 120 of the first terminal device 100 is realized as a touch screen, a sensor of the touch screen may sense various types of user manipulations, and various touches of the user sensed by the sensor may be connected to executions of various functions. For example, the sensor may sense an operation (tapping) of pressing a screen with a finger and then removing the finger from the screen, an operation (double tapping) of pressing the screen with the finger consecutively two times, an operation (long tapping) of long pressing the screen for a preset time, an operation (dragging) of pressing a point on the screen for a preset time or more and then dragging to another point on the screen, an operation (swiping) of swiping one screen at a constant speed and in a constant direction, an operation (pinching in) of pressing the screen with two fingers and then pinching the screen in, an operation (pinching out) of pressing the screen with the two fingers and then pinching the screen out, etc.

After the user inputs the manipulation command of the external device 300 on the mirroring screen as described above, the controller 130 transmits a control command of the external device 300 corresponding to the manipulation command to the second terminal device 200 in operation S1150.

The controller 130 may control the external device 300 according to the control command transmitted from the second terminal device 200.

FIG. 12 is a flowchart illustrating a remote control method of the second terminal device 200, according to an exemplary embodiment.

Referring to FIG. 12, in operation S1210, the communicator 210 of the second terminal device 200 makes a phone call to another terminal device, i.e., the first terminal device 100. If the communicator 210 makes the phone call, the second terminal device 200 transmits state information of the external device 300, to which the second terminal device 200 has a remote control right, to the first terminal device 100 in operation S1220.

In detail, the controller 220 of the second terminal device 200 may request a remote control and a transmission of the state information from the external device 300 through the communicator 210. The external device 300 may determine whether the second terminal device 200 has the remote control right and, if the second terminal device 200 has the remote control right, transmit the state information to the second terminal device 200.

The transmission of the state information from the external device 300 to the second terminal device 200 may be repeatedly performed at preset time intervals. Also, the determination as to whether the second terminal device 200 has the remote control right to the external device 300 may be performed once or may be performed whenever requesting the state information, to strengthen security.

After the second terminal device 200 transmits the state information of the external device 300 to the first terminal device 100 in operation S1220, the controller 220 of the second terminal device 200 receives a control command for the external device 300 from the first terminal device 100 in operation S1230. In operation S1240, the controller 220 controls the external device 300 according to the received control command.

The external device 300 determines whether the control command is received from a device having a remote control right and, if it is determined that the control command is received from the device having the remote control right, performs an operation corresponding to the control command. Thereafter, the external device 300 may transmit new state information to the second terminal device 200. The second terminal device 200 may receive the new state information and transmit the new state information to the first terminal device 100, and the controller 130 of the first terminal device 100 may update the mirroring screen based on the new state information.

According to various exemplary embodiments as described above, a user of a terminal device temporarily has an access right of another terminal device for a remote control only when making a phone call. There is a lower likelihood that a security problem or a privacy invasion will occur, and the user does not need to go through a complicated presetting or authentication process for the remote control.

The various exemplary embodiments described above with reference to FIGS. 1 through 10 may be added to a remote control method of a first or second terminal device described above, or may be modified and added as understood by those skilled in the art. Therefore, various exemplary embodiments for a remote control method that may be deduced by the above-described content.

The remote control method according to the above-described various exemplary embodiments may be stored on a non-transitory readable medium. The non-transitory readable medium may be installed and used in various types of devices.

The non-transitory computer-readable medium refers to a medium which does not store data for a short time, such as a register, a cache memory, or the like, but semi-permanently stores data and is readable by a device. In detail, the above-described applications or programs may be stored and provided on a non-transitory computer readable medium such as a CD, a DVD, a hard disk, a blue-ray disk, a universal serial bus (USB), a memory card, a ROM, or the like.

The foregoing exemplary embodiments and advantages are merely exemplary and are not to be construed as limiting. One or more exemplary embodiments can be readily applied to other types of apparatuses. Also, the description of the exemplary embodiments is intended to be illustrative, and not to limit the scope of the claims and their equivalents, and many alternatives, modifications, and variations will be apparent to those skilled in the art.

What is claimed is:

1. A terminal device comprising:
   a communicator configured to establish a phone call with a second terminal device having a remote control right to a third device, and to receive state information of the third device from the second terminal device, the second terminal device receiving the state information of the third device from the third device;
   a display configured to display a mirroring screen corresponding to a screen displayed on the third device based on the received state information; and
   a controller configured to, in response to a user manipulation command being input on the mirroring screen, transmit a control command for the third device corresponding to the input user manipulation command to the second terminal device,
   wherein the controller is further configured to control the communicator to, in response to a content stored in the terminal device being moved to an area of the display corresponding to the mirroring screen, transmit, to the second terminal device, the content and a command for controlling the third device to output the content.

2. The terminal device of claim 1, wherein:
   the second terminal device has a remote control right to a plurality of third devices, and
   the controller is further configured to control the communicator to receive information about the plurality of third devices from the second terminal device, control the display to display the information, and control the communicator to, in response to a selection of one of the plurality of third devices to be remotely controlled from the displayed information, request state information of the selected one of the plurality of third devices.

3. The terminal device of claim 1, wherein the controller is further configured to control the display to display the mirroring screen on a whole area of the display.

4. The terminal device of claim 1, wherein the controller is further configured to control the communicator to, in response to at least one device connected to the terminal device being selected, transmit the content to the selected at least one device.

5. The terminal device of claim 1, wherein the controller is further configured to control the display to, in response to the phone call with the second terminal device ending, cease displaying the mirroring screen.

6. A terminal device comprising:
   a communicator configured to establish a phone call with a second terminal device, configured to receive state information of a third device, to which the terminal device has a remote control right, from the third device, and configured to transmit the state information of the third device to the second terminal device during the phone call;
   a controller configured to, in response to a control command for the third device being received from the second terminal device, transmit the control command to the third device to control the third device according to the control command, wherein a mirroring screen corresponding to a screen displayed on the third device is displayed on a display of the second terminal device based on the state information of the third device, and wherein, in response to a content stored in the second terminal device being moved to an area of the display corresponding to the mirroring screen, the communicator is configured to receive, from the second terminal device, the content and a command for controlling the third device to output the content.

7. The terminal device of claim 6, wherein:
the terminal device has a remote control right to a plurality of third devices, and
the controller is further configured to control the communicator to, in response to one of the plurality of third devices to be remotely controlled being selected, transmit state information of the selected one of the plurality of third devices to the second terminal device.

8. The terminal device of claim 6, wherein:
the terminal device has a remote control right to a plurality of third devices, and
the controller is further configured to control the communicator to transmit information corresponding to the plurality of third devices to the second terminal device and to, in response to receiving a request for state information of one of the plurality of third devices to be remotely controlled being received from the second terminal device, transmit the state information of the one of the plurality of third devices to the second terminal device.

9. The terminal device of claim 6, wherein the controller is further configured to, in response to the phone call to the second terminal device ending, cease controlling of the third device according to the received control command.

10. A remote control method of a terminal device, the remote control method comprising:
establishing a phone call with a second terminal device having a remote control right to a third device;
receiving state information of the third device from the second terminal device, the second terminal device receiving the state information of the third device from the third device;
displaying a mirroring screen corresponding to a screen displayed on the third device based on the received state information;
receiving a user manipulation command on the mirroring screen;
transmitting a control command for the third device corresponding to the received user manipulation command to the second terminal device; and
in response to a content stored on the terminal device being moved to an area of the mirroring screen, transmitting, to the second terminal device, the content and a command for controlling the third device to output the content.

11. The remote control method of claim 10, wherein the second terminal device has a remote control right to a plurality of third devices, and
the remote control method further comprises:
receiving information corresponding to the plurality of third devices from the second terminal device;
displaying the information corresponding to the plurality of third devices;
selecting one of the plurality of third devices to be remotely controlled from the displayed information; and
requesting state information of the selected one of the plurality of third devices.

12. The remote control method of claim 10, further comprising:
selecting at least one device connected to the terminal device; and
transmitting the content to the selected at least one device.

13. A remote control method of a terminal device, the remote control method comprising:
receiving state information of a third device, to which the terminal device has a remote control right, from the third device;
transmitting, during a phone call being with a second terminal device, the state information of the third device to the second terminal device;
receiving a control command for the third device from the second terminal device; and
transmitting the control command to the third device to control the third device according to the control command,
wherein a mirroring screen corresponding to a screen displayed on the third device is displayed on a display of the second terminal device based on the state information of the third device, and
wherein the remote control method further comprises, in response to a content stored in the second terminal device being moved to an area of the display corresponding to the mirroring screen, receiving, from the second terminal device, the content and a command for controlling the third device to output the content.

14. The remote control method of claim 13, wherein:
the terminal device has a remote control right to a plurality of third devices,
the remote control method further comprises selecting one of the plurality of third devices to be remotely controlled, and
the transmitting of the state information to the second terminal device comprises transmitting state information of the selected one of the plurality of third devices to the second terminal device.

15. The remote control method of claim 13, wherein:
the terminal device has a remote control right to a plurality of third devices,
the remote control method further comprises transmitting information about the plurality of third devices to the second terminal device, and
the transmitting of the state information to the second terminal device comprises transmitting, in response to a request for state information of one of the plurality of third devices being received from the second terminal device, the state information of the one of the plurality of third devices.

16. The terminal device of claim 6, wherein the controller is further configured to control the third device according to the received control command only during the phone call.

* * * * *